United States Patent
Baikrich

[11] Patent Number: 5,193,031
[45] Date of Patent: Mar. 9, 1993

[54] DIVERGENCE AND MARKING DEVICE FOR A TARGET MARKER

[76] Inventor: Michel Baikrich, 42 Xhierfomont, 4086 Stoumont, Belgium

[21] Appl. No.: 635,118
[22] PCT Filed: Jun. 1, 1990
[86] PCT No.: PCT/BE90/00025
§ 371 Date: Feb. 22, 1991
§ 102(e) Date: Feb. 22, 1991
[87] PCT Pub. No.: WO91/00489
PCT Pub. Date: Jan. 10, 1991

[30] Foreign Application Priority Data
Jun. 28, 1989 [BE] Belgium ............... 8900703

[51] Int. Cl.⁵ .............. G02B 27/20; G02B 27/00
[52] U.S. Cl. .................... 359/800; 359/724; 359/821; 359/827
[58] Field of Search ........... 359/800, 724, 821, 827

[56] References Cited
U.S. PATENT DOCUMENTS
3,947,093 3/1976 Goshima et al. ............ 359/716
4,256,370 3/1981 Gold ........................ 359/724
4,429,957 2/1984 King ........................ 359/724
4,897,536 1/1990 Miyoshi ..................... 250/561
4,920,053 8/1990 Inoue et al. ................ 359/368

FOREIGN PATENT DOCUMENTS
493420 5/1950 Belgium .
14269 of 1913 United Kingdom .

OTHER PUBLICATIONS
*International Defense Review*, vol. 21, No. 10, "Eyes Like a Hawk . . . With Owl", p. 1291 (Oct. 1988).

Primary Examiner—Jon W. Henry
Attorney, Agent, or Firm—Charles F. Meroni, Jr.

[57] ABSTRACT

A divergent lens (4) perforated in its center by a hole (5) of small diameter is placed opposite the aperture (12) of a laser beam type marker (10) in order to pick up the laser beam comprising substantially parallel rays (13) from the marker, the lens (4) deflecting the laser rays which reach it round the central hole (9) so as to produce a divergent beam (14) whereas the rays which reach the central hole (4) pass through it without being deflected so as to form a fine pencil of light (15) of higher intensity serving to mark a target. The divergent lens (4) is, for example, mounted in a aperture (3) provided in the head of a body (2) intended to be slid on and to cover the head (11) of a laser beam type marker (10). The divergent lens (4) can also be mounted in the aperture (12) provided in the head (11) of a laser beam type marker (10).

13 Claims, 4 Drawing Sheets

DIVERGENCE AND MARKING DEVICE FOR A TARGET MARKER

The present invention relates to an optical device intended to be combined with a laser beam type target marker in order to improve the visibility of a target inside a dim building by means of light intensifying goggles (commonly known as night vision goggles).

A laser beam type target marker comprises a laser generator which generally emits radiation within the infrared range and is provided with a collimator which produces a narrow beam having very slight divergence which gives, for example, a circle of light of 35 millimeters at a distance of 100 meters. Although apparatus of this type is obviously effective for night observation, the lighting power of the beam inside a very dim building is so intense over a small area that it produces a dazzling halo of light round the light spot, which gives the operator the impression of working in fog and makes it impossible for him to discern the target correctly.

The present invention overcomes this drawback by means of an optical device which is characterised by a divergent lens perforated in its centre by a small diameter hole and intended to be placed opposite the aperture of a laser beam type target marker in order to pick up the laser beam comprising substantially parallel rays from the marker, the lens deflecting the laser rays which reach it round the central hole in order to produce a divergent beam while the rays which reach the central hole pass through it without being deflected so as to form a fine pencil of light of higher intensity which serves to mark a target.

The divergent lens can be mounted in an aperture provided in a body which is intended to be slid on and to cover the head of a laser beam type target marker. It can also be mounted in the head of a laser beam type target marker at the location of the usual aperture.

The device according to the invention is described hereinafter with reference to the accompanying drawings.

Figure 1:
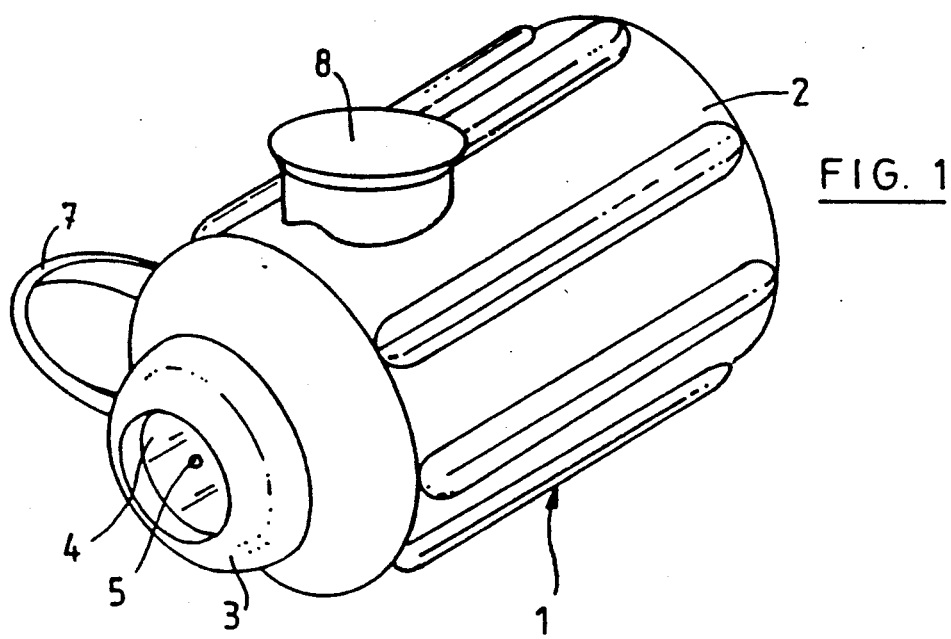
FIG. 1 is a perspective view of an example of a divergence device according to the invention.
Figure 2:
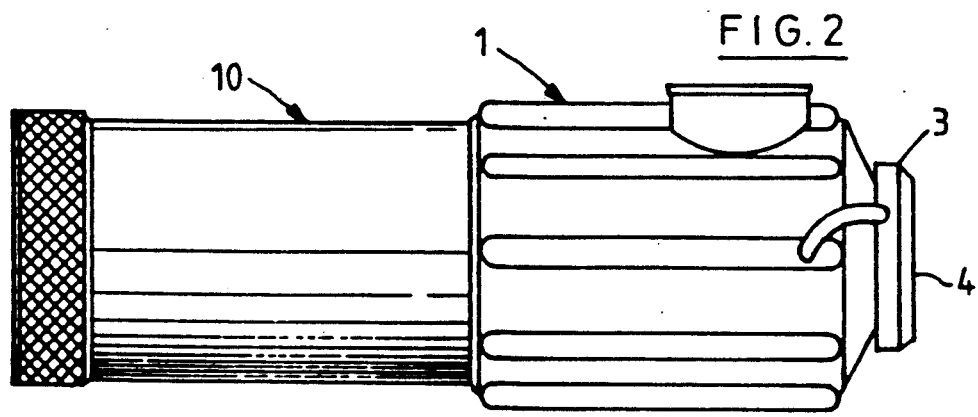
FIG. 2 shows the device in FIG. 1 positioned on an example of a laser beam type marker.

FIG. 1 shows an embodiment of the divergence device according to the invention. This is a device in the form of a cap intended to be fitted on the head of a laser beam type marker, as shown in FIG. 2. A laser beam type marker is an apparatus generally mounted on a firearm to render a target visible or more visible in the obscurity. The divergence device according to the invention, designated in its entirety by reference numeral 1, comprises a hollow body 2 of general cylindrical shape which is open at one end and closed at its opposite end by an aperture 3 equipped with a divergent lens 4 perforated in its centre by a hole 5 having a very small diameter, for example of 0.5 millimeters. The body can be produced from synthetic or natural material. The divergent lens 4 can be produced from organic or mineral material and it can be given a non-reflective and/or non-scratch treatment.

The aperture 3 with the divergent lens 4 is preferably separable from the body 2 to facilitate its use on a marker, as will be seen hereinafter. In the embodiment shown in FIG. 1, the aperture 3 is attached to the body 2 by a flexible cord 7 which prevents it from being lost when it is separated from the body. The stud 8 is provided to receive the aperture 3 when the divergent lens 4 is not used. In a further embodiment, a fixed, inseparable aperture 3 could be provided.

Figure 3:
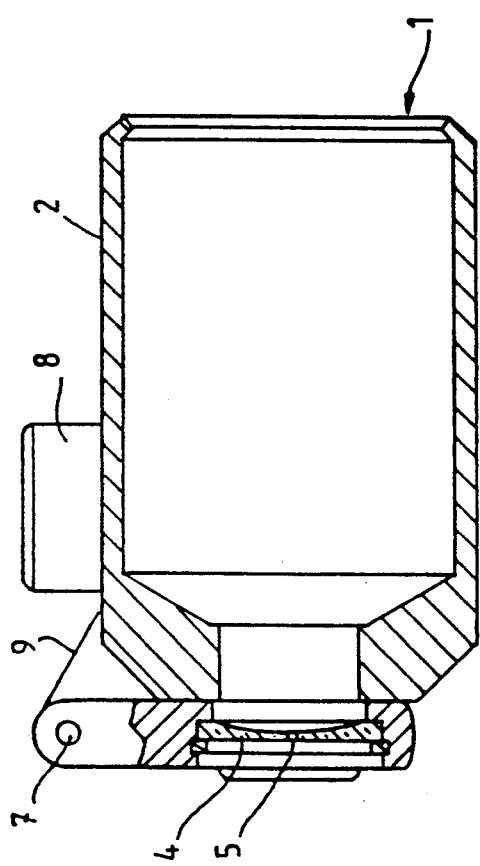
FIG. 3 shows an axial section through a variation of the device in FIG. 1.

The means of fastening the aperture 3 comprising the divergent lens 4 can obviously be produced in various ways. FIG. 3 shows an embodiment in which the aperture 3, which is separable from the body 2 of the cap 1, is suspended from a horizontal pin 7 fixed on tabs 9 integral with the body 2, the aperture 3 being mounted so as to be able to pivot round the aforementioned pin 7.

Figure 4:
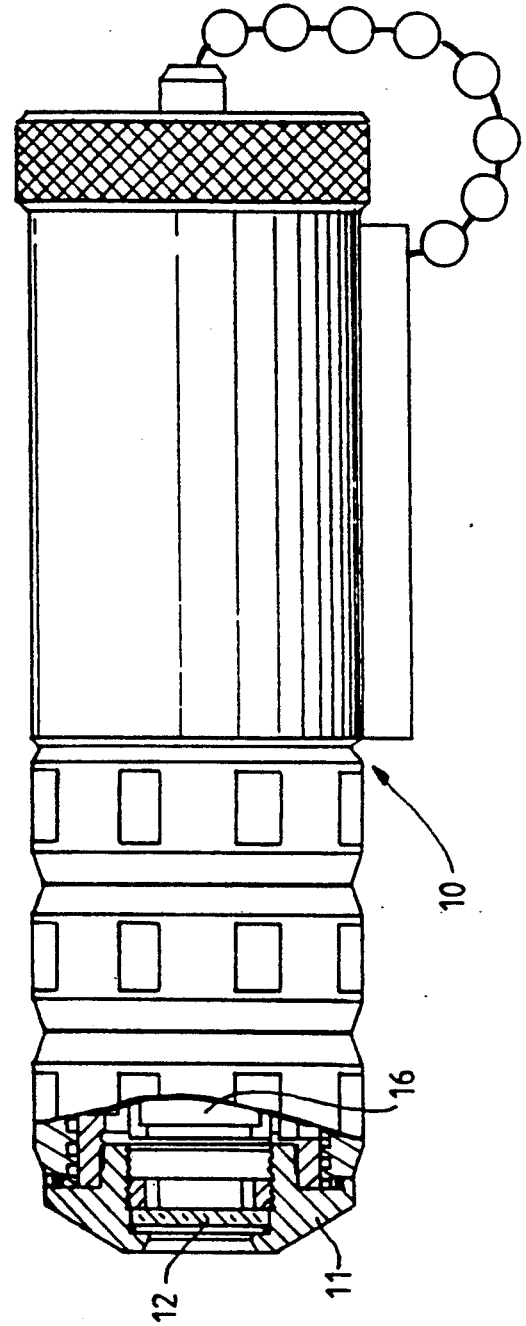
FIG. 4 shows an example of a laser beam type marker with an axial section through the head of the marker.

A divergence device as shown in FIG. 1 or 2 is intended to be slid onto the head of a laser beam type target marker. Apparatus of this type is known per se. It assumes the form of an elongate casing in which there are accommodated a laser generator, a source of electric energy for supplying the laser generator and a device for adjusting the axial position of the laser generator so that, when the marker is fixed on a firearm, the axis of the laser beam coincides with the axis of the barrel of the arm at a predetermined distance therefrom. FIG. 4 shows an embodiment of a laser beam type marker 10. The head 11 of the marker has an aperture 12 through which there emerges the laser beam emitted by the barrel 16 of the laser generator. This is a beam having substantially parallel rays. The aperture 12 is usually closed by a simple plate of glass.

Figure 5:
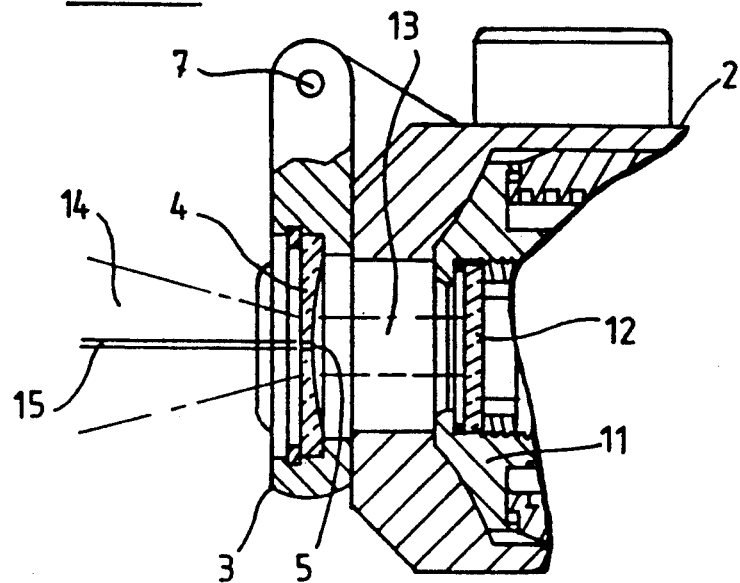
FIG. 5 is an axial section of the device in FIG. 3 positioned on the laser beam type marker shown in FIG. 4.

FIG. 5 shows a divergence device 1 as shown in FIG. 3 positioned on the head of the laser beam type marker 10 in FIG. 3. When the device 1 is thus fitted on the head of the marker 10, the divergent lens 4 is located opposite the aperture 12 of the marker and intercepts the laser beam 13 issuing from the aperture of the marker. The laser rays which reach the portion of the lens 4 round the central hole 5 pass through the lens where they are deflected and issue therefrom while forming a highly divergent beam 14 whereas the central laser rays which reach the central hole 5 pass through it without being deflected nor spread. After having passed through the divergent lens 4, the laser beam thus comprises a highly divergent beam 14 surrounding a fine concentrated laser pencil 15.

The divergent beam 14 produces, for example, a patch of light reaching two to three metres or more at a distance of twenty-five meters, depending upon the divergence adopted. The relatively great divergence of the beam 14 has the effect of reducing the luminous intensity thereof on a target and of illuminating the target and the surroundings without dazzling. As the operator is not dazzled, he is thus capable of recognising the target instantaneously and reliably with the additional advantage of allowing the operator to advance in total darkness with the aid of night vision goggles as if he had an infrared electric torch.

On the other hand, the fine laser pencil 15 passing through the central hole 5 reaches the target with high intensity and without being deflected. The laser pencil 15 therefore marks the actual point aimed at on the target, allowing reliable aiming with the certainty of reaching the target at the desired location.

After having placed the divergence device 1 according to the invention on a target marker with the lens 4 in position as shown in FIG. 5, an operator can work and observe a target in the obscurity inside a building with the aid of night vision goggles and without being dazzled.

Figure 6:
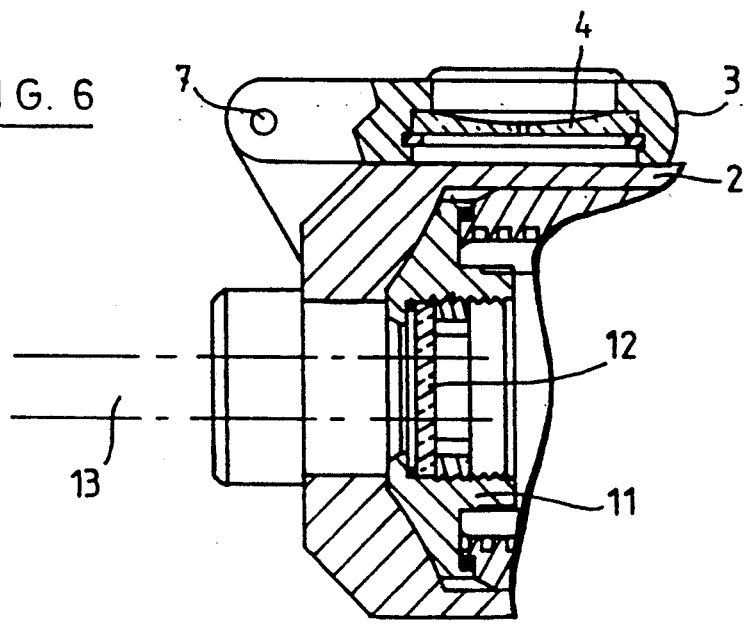
FIG. 6 shows the use of the device shown in FIG. 5 to operate outside.

However, if the operator wishes to work outside (full moon), he merely has to pivot the aperture 3, as shown in FIG. 6, to allow the normal laser beam 13 of the target marker to pass and, under these conditions of use, the operator can have all the power of the laser beam at his disposal. In FIG. 6, the aperture 3 is held in the raised position by means of fasteners 9.

In the examples shown in FIGS. 1 and 2, the divergent lens 4 is a plano-concave lens. However, the lens can be produced in a different form, for example in the form of a symmetrical concave lens.

Figure 7:
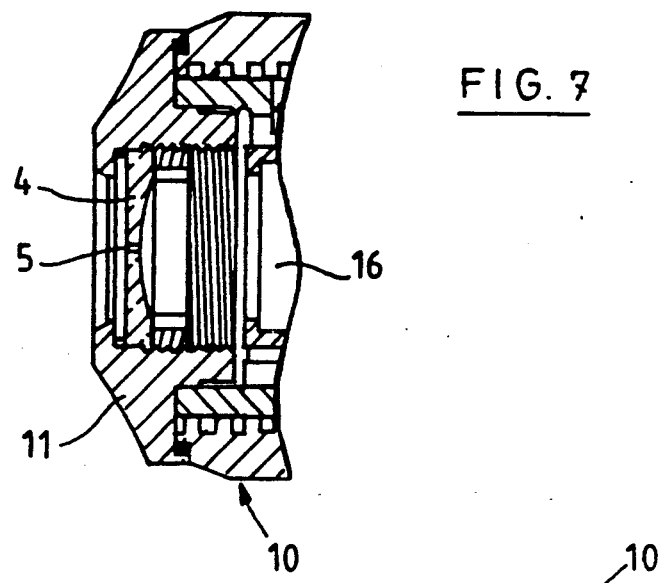
FIG. 7 shows the head of an example of a laser beam type marker in which a divergence device according to the invention is incorporated.

Another embodiment according to the invention involves incorporating the divergent lens 4 directly into the head of a target marker at the location of the usual aperture. FIG. 7 shows an axial section through the head of a target marker 10 in which the aperture 12 is provided with a divergent lens 4 according to the invention perforated in its centre by a hole 5 of small diameter.

Figure 8:
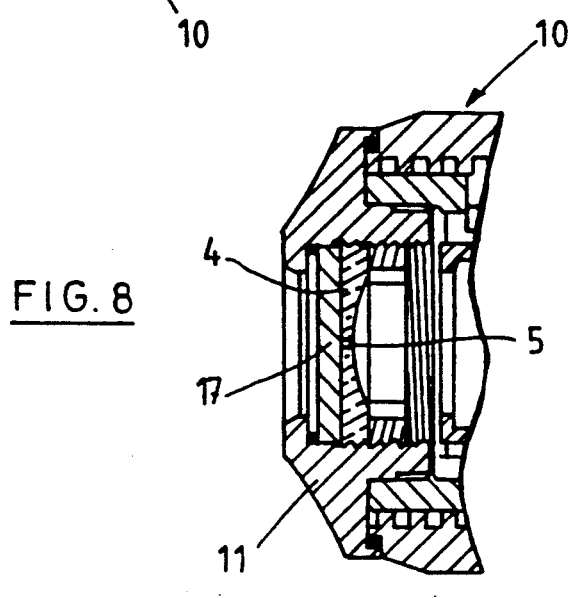
FIGS. 8 and 9 show two variations of the divergent lens according to the invention incorporated into the head of a laser beam type marker.
Figure 9:
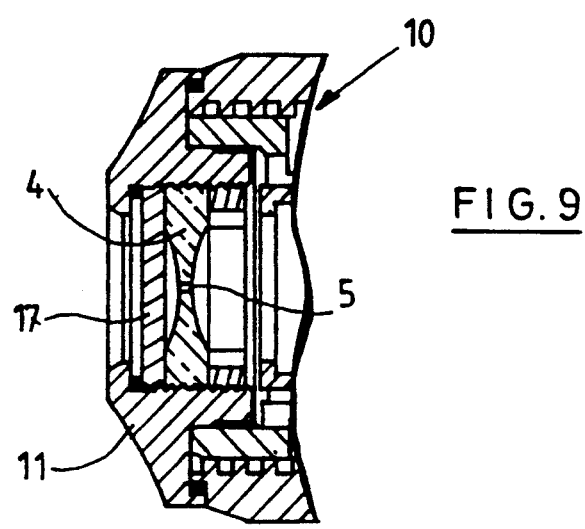

To seal the unit, a plain lens 17 can be stuck on the flat face of the divergent lens 1 if the divergent lens 1 is plano-concave (FIG. 8) or on the flat rim of the divergent lens 1 if the divergent lens 1 is symmetrically concave (FIG. 9).

The examples described hereinbefore are examples given by way of illustration and the invention is not limited to these examples. Any modification, variation or equivalent arrangement should be considered as falling within the scope of the invention.

I claim:

1. A laser beam type marker comprising a casing in which a laser generator is accommodated, the head of the casing having an aperture to allow the passage of the laser beam produced by the laser generator, characterised in that the aperture is blocked by a divergent lens perforated by a central hole such that the laser rays which reach the lens round the central hole produce a divergent beam while the rays which reach the central hole pass through it without being deflected so as to form a fine pencil of light of higher intensity which serves to mark a target.

2. The device according to claim 1, wherein the perforated divergent lens is a plano-concave lens.

3. The device according to claim 1, wherein the divergent lens is a plano-concave lens and further comprising a plain lens which is stuck on the flat face of the plano-concave lens in order to seal the apparatus.

4. The device according to claim 1, wherein the perforated divergent lens is a symmetrical concave lens.

5. The device according to claim 1, wherein the divergent lens is a symmetrical concave lens having a flat rim and further comprising a plain lens which is stuck on a flat rim of said symmetrical concave lens in order to seal the apparatus.

6. A divergence and marking device for use with a laser beam type marker, comprising a body having an aperture, a plano-concave divergent lens secured to said body aperture, said plano-concave divergent lens being perforated in its center by a hole having a small diameter, such that the laser rays which reach the divergent lens round the central hole therein produce a divergent beam while the rays which reach said central hole pass through it without being deflected so as to form a fine pencil of light of higher intensity which serves to mark a target.

7. The device according to claim 6, comprising a plain lens which is stuck on the flat face of the plano-concave divergent lens in order to seal the apparatus.

8. The device according to claim 7, wherein the divergent lens is mounted in a frame which is separable from said body.

9. The device according to claim 7, wherein the divergent lens is mounted in a frame articulated round a pivot pin fixed to the body.

10. A divergence and marking device for use with a laser beam type marker, comprising a body having an aperture, a symmetrical concave divergent lens secured to said body aperture, said symmetrical concave divergent lens being perforated in its center by a hole having a small diameter, such that the laser rays which reach the divergent lens round the central hole therein produce a divergent beam while the rays which reach said central hole pass through it without being deflected so as to form a fine pencil of light of higher intensity which serves to mark a target.

11. The device according to claim 10, wherein the symmetrical concave lens has a flat rim and further comprising a plain lens which is stuck on a flat rim of said symmetrical concave divergent lens in order to seal the apparatus.

12. The device according to claim 11, wherein the divergent lens is mounted in a frame which is separable from said body.

13. The device according to claim 11, wherein the divergent lens is mounted in a frame articulated round a pivot pin fixed to the body.

* * * * *